US006633530B1

(12) United States Patent
Takeda

(10) Patent No.: US 6,633,530 B1
(45) Date of Patent: Oct. 14, 2003

(54) OPTICAL PICKUP APPARATUS WITH LIGHT SOURCE UNIT INCLUDING FIRST LIGHT SOURCE AND COMMON LIGHT RECEIVING SECTION

(75) Inventor: Tadashi Takeda, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 120 days.

(21) Appl. No.: 09/651,743

(22) Filed: Aug. 30, 2000

(30) Foreign Application Priority Data

Aug. 31, 1999 (JP) .......................................... 11-244639

(51) Int. Cl.[7] .............................................. G11B 7/00
(52) U.S. Cl. ............................. 369/112.01; 369/112.16
(58) Field of Search ............................ 369/53.2, 112.1, 369/112.04, 94, 44.37, 112.05, 112.09, 112.16, 112.27, 110.02

(56) References Cited

U.S. PATENT DOCUMENTS

| | | | | |
|---|---|---|---|---|
| 5,661,711 A | * | 8/1997 | Tanaka et al. ............... | 369/112 |
| 5,696,749 A | * | 12/1997 | Brazas, Jr. et al. .......... | 369/109 |
| 5,912,868 A | * | 6/1999 | Hayashi et al. ............... | 369/58 |
| 6,069,862 A | * | 5/2000 | Fujita et al. ................. | 369/112 |
| 6,078,555 A | * | 6/2000 | Lee et al. ..................... | 369/112 |
| 6,084,845 A | * | 7/2000 | Mizuno ....................... | 369/112 |
| 6,298,028 B1 | * | 10/2001 | Arikawa et al. ............. | 369/53.2 |
| 6,345,029 B1 | * | 2/2002 | Lee et al. .................... | 369/118 |
| 6,414,930 B1 | * | 7/2002 | Shiono et al. .............. | 369/44.12 |

* cited by examiner

Primary Examiner—Nabil Hindi
(74) Attorney, Agent, or Firm—Hogan & Hartson, LLP

(57) ABSTRACT

An optical pickup apparatus has a light source unit that includes a first light source and a common light-receiving device having first and second light-receiving sections. The optical pickup apparatus further includes an optical path composition element that guides first light emitted from the first light source and second light emitted from another light source into an optical path that passes an objective lens, and an optical path polarization element that guides reflected lights of the first and the second lights to the common light-receiving device. The optical path polarization element is mounted in the light source unit for guiding reflected lights of the first and second lights to the common light-receiving device.

22 Claims, 4 Drawing Sheets

Patterns of element for error signal generation and optical path polarization

EXPANDED VIEW OF LIGHT RECEIVING SECTION

Light-receiving surfaces for an individual light source

Light-receiving surfaces for light source unit

OPTICAL PICKUP APPARATUS WITH LIGHT SOURCE UNIT INCLUDING FIRST LIGHT SOURCE AND COMMON LIGHT RECEIVING SECTION

BACKGROUND OF THE INVENTION

1. Field of the Invention

The present invention relates to an optical pickup apparatus having a plurality of light sources of different wavelengths in order to record or reproduce data stored on a plurality of optical recording media. The present invention also relates to a method for manufacturing an optical pickup apparatus.

2. Description of Related Art

Different optical recording media, such as, a DVD, a CD and the like, have different track pitches. In order to record or reproduce data on these optical recording media, laser beams having different wavelengths are required. For example, in other to reproduce data on a DVD, a laser beam having a wavelength of 650 nm is required. Also, a laser beam having a wavelength of 650 nm can be used to reproduce data on an ordinary CD or a CD-ROM. However, for reproducing data on a CD-R, a laser beam having a wavelength of 650 nm cannot be used to properly reproduce the data because the CD-R has a low reflectance. In this case, a laser beam having a wavelength of 780 nm is used instead. For these reasons, an optical pickup apparatus for recording and reproducing data on optical media of different types is provided with two different laser beam sources that generate laser beams having wavelengths of 650 nm and 780 nm.

Japanese laid-open patent application HEI 9-120568 describes a two-light source type optical pickup apparatus. The optical pickup apparatus has a common semiconductor substrate and two laser diode chips formed on the semiconductor substrate. The laser diode chips generate laser beams having two different wavelengths. A prism having two reflective surfaces is mounted on the same semiconductor substrate, and laser beams emitted from the diode chips are guided into a common optical path, using the two reflective surfaces of the prism.

Also, Japanese laid-open patent application HEI 9-128794 describes a two-light source type optical pickup apparatus in which two laser beam sources and one common light-receiving device are provided. Lights reflected from a recording medium are guided into the common light-receiving device by using a common diffraction grating. Since the diffraction grating has wavelength dependency, positions of the two laser beam sources with respect to the optical axis are adjusted to offset the wavelength dependency, such that the lights can be received by the common light-receiving device.

Furthermore, Japanese laid-open patent application HEI 9-138967 describes an optical pickup apparatus having two light source units that emit laser beams of different wavelengths. Each of the light source units has a laser beam source and a light-receiving element that receives light emitted from the laser beam source and reflected from a recording medium.

The conventional two-light source type optical pickup apparatus described above have the following problems.

The optical pickup apparatus described in Japanese laid-open patent application HEI 9-120568 uses a prism having two reflective surfaces. Therefore, when one of the laser diode chips is positioned, the position thereof needs to be adjusted while the other laser diode chip is emitting light. An assembly work that requires such a positional adjustment takes a long time and an assembly machine for performing such an assembly work is costly.

Also, it is noted that optical films are formed to provide the two reflective surfaces on the prism. Since the prism that is mounted on the semiconductor substrate is very small, the adjustment of the film characteristics is difficult during the formation of the optical films. Furthermore, the prism is an optical component, which would likely have burrs and chips. Accordingly, it is difficult to provide a small prism with an optically effective aperture diameter that is required for the prism. Therefore, the manufacturing cost for a small prism having two reflective surfaces becomes high. Moreover, since such a prism is difficult to handle during assembly, the assembly cost becomes high.

Furthermore, it is noted that a three-beam method is generally used as a tracking error detection method for detecting tracking errors in reproducing data on CDs, and a differential push-pull (DPP) method is often used in the case of re-writable recording medium. When such a detection method is used, a diffraction grating for generating three beams is required for each of the different laser beams. However, the optical system described in Japanese laid-open patent application HEI 9-120568 can not dispose an independent diffraction grating for generating three beams for each of the different laser beam sources, or independently position or rotationally adjust the multiple light sources. Accordingly, the optical system described in the reference is applicable to a limited range of systems, and therefore cannot be widely used.

Next, in the optical pickup apparatus described in Japanese laid-open. patent application HEI 9-128794, the two laser beams having different wavelengths are transmitted through one common diffraction grating. Therefore, the grating surface of the diffraction grating needs a special structure that causes diffractive actions only for the respective wavelengths. For example, planes of polarization for the light sources are crossed at right angle, and a polarization dependent diffraction grating is used. The diffraction grating of this type is expensive, and therefore results in a higher cost for the apparatus.

Also, in the optical system described above, one of the laser beam sources concurs with the optical axis of the objective lens. However, the other laser beam source is disposed out of the optical axis of the objective lens. As a result, with respect to the light source that is disposed out of the optical axis of the objective lens, changes in the optical characteristic that take place as the objective lens moves to follow the tracks of a recording medium become different depending on directions of the movement of the objective lens. When changes in the characteristic during the movements of the objective lens are not symmetrical with respect to the optical axis, the system needs to be provided with certain countermeasures. Accordingly, the optical system described in this reference cannot be widely used.

Furthermore, the optical system described in Japanese laid-open patent application HEI 9-128794 uses a common diffraction grating. As a result, the condition for generating three beams cannot be adjusted separately or independently for each of the laser beams of the different wavelengths, in a manner that a recording track is interposed between the two laser beams of the different wavelengths with the laser beams converged on the recording track at desired angles. Therefore, the optical system described in this reference is applicable to a limited range of systems, and therefore cannot be widely used.

On the other hand, the optical pickup apparatus described in Japanese laid-open patent application HEI 9-138967 uses two sets of light source units, in which each of the light source units is internally mounted with a laser beam source and a light-receiving element. This results in problems, such as, higher apparatus costs as a whole. Moreover, the positional adjustment needs to be conducted for each of the optical elements in each of the light source units. These results in problems, such as, a longer time required for the adjusting work.

SUMMARY OF THE INVENTION

In view of the problems of the conventional two-light source type or multiple-light source type optical pickup apparatuses, it is an object of the present invention to provide an optical pickup apparatus that is widely applicable to many different systems, and that can readily adjust positions of its optical elements without increasing the cost.

In accordance with one embodiment of the present invention, an optical pickup apparatus has a light source unit that includes a first light source and a common light-receiving device having first and second light-receiving sections.

The optical pickup apparatus may further include other optical devices, such as, an optical path composition element that guides first light emitted from the first light source and second light emitted from another light source into an optical path that passes an objective lens, and an optical path polarization element that guides reflected lights of the first and the second lights to the common light-receiving device.

In one aspect of the embodiments of the present invention, the optical path polarization element may be mounted in the light source unit for guiding reflected lights of the first and second lights to the common light-receiving device.

In another aspect of the embodiment of the present invention, the first and second light-receiving sections of the common light-receiving device may be formed on a semiconductor substrate. The first and second light-receiving sections are formed from first group and second group of light-receiving elements, respectively, that receive reflected lights of the first light and the second light, respectively.

In this manner, in accordance with the embodiment of the present invention, one of the light sources mounted in the light source unit that has the common light-receiving device. Accordingly, light emitted from the other light source and reflected on a recording medium is also received through the optical path polarization element by the common light-receiving device in the light source unit. Therefore, an optical pickup apparatus can be equipped with a single light-receiving device for receiving multiple light beams. As a result, the cost for the apparatus is lowered, compared with the conventional apparatus that uses multiple light source units including multiple light-receiving devices.

Furthermore, a diffraction element for generating three beams can be disposed in each of the spaces between the light source unit and the optical path composition element and between the second light source and the optical path composition element. As a result, the diffraction elements can be adjusted independently from one another, such that three beams provided by each of the diffraction elements can be irradiated on a recording track at any angles. Therefore, the apparatus of the embodiment of the present invention is applicable to a wide range of different systems.

Moreover, with the apparatus of the embodiment of the present invention, an optical axis of a laser beam emitted from each of the light sources can be adjusted to concur with an optical axis of the objective lens. As a consequence, changes in the optical characteristic of the objective lens accompanied with movements of the objective lens are symmetrical about the optical axis. Therefore, the apparatus of the embodiment of the present invention does not require a special signal compensation circuit that is required when such changes are asymmetrical.

The optical path polarization element may be a diffraction type optical element. The diffraction type optical element may be mounted on the light source unit to form an integral part of the light source unit. The diffraction type optical element may be rotatably adjustable about an optical axis of the first light emitted from the first light source. As a result, the work for adjusting the angular positions of these elements is readily performed.

Furthermore, in accordance with the embodiment of the present invention, the optical pickup apparatus may be provided with a positioning member that supports the light source unit, in a manner that an optical distance between the light source unit and the objective lens is adjustable. As a result, differences in the optical distance can be compensated in a single light source type optical pickup apparatus that may be provide by removing the second light source and the optical path composition element from the apparatus described above.

Other features and advantages of the invention will be apparent from the following detailed description, taken in conjunction with the accompanying drawings that illustrate, by way of example, various features of embodiments of the invention.

PREFERRED EMBODIMENTS

Figure 1:
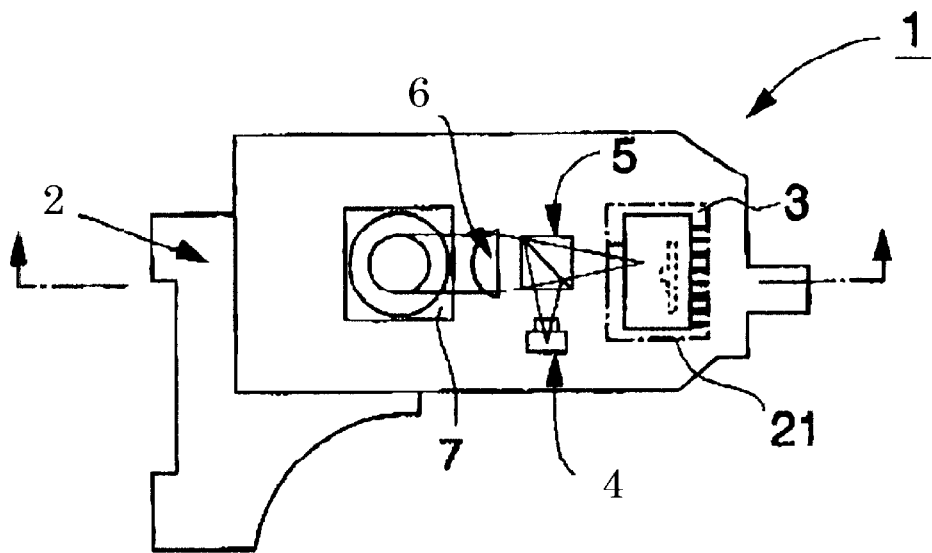
FIGS. 1(a) and 1(b) schematically show a plan view and a cross-sectional view of a two-light source type optical pickup apparatus in accordance with one embodiment of the present invention.
Figure 1:
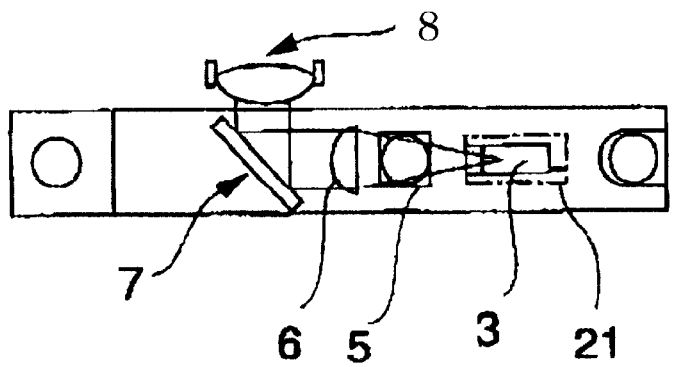

An optical pickup apparatus in accordance with one embodiment of the present invention is described below with reference to the accompanying drawings.

FIGS. 1(a) and 1(b) schematically show a plan view and a cross-sectional view of an optical pickup apparatus 1 in accordance with one embodiment of the present invention. The optical pickup apparatus 1 of the present embodiment is a two-light source type, and is formed with an apparatus frame 2. A light source unit 3 and an independent light source 4 are mounted on the apparatus frame 2. The light source unit 3 includes an optical device including a first laser beam source that emits a laser beam of a long wavelength (for example, 780 nm). The independent light source 4 includes a second laser beam source that emits a laser beam of a short wavelength (for example, 650 nm). The light source unit 3 and the independent light source 4 are mounted on the apparatus frame 2, in a manner that optical axes of the emitted laser beams cross at right angle with one another.

A prism 5 that serves as an optical element for optical path composition is disposed at a crossing point of the optical axes of the emitted laser beams. A collimate lens 6 is disposed in the light emitting side of the prism 5. A raising mirror 7 is disposed in the light emitting side of the collimate lens 6. Emitted laser beams are reflected by the raising mirror 7 at right angle, and pass through an objective lens 8 to be converged on a recording surface of an optical disc (not shown) as a light beam spot.

Figure 2:
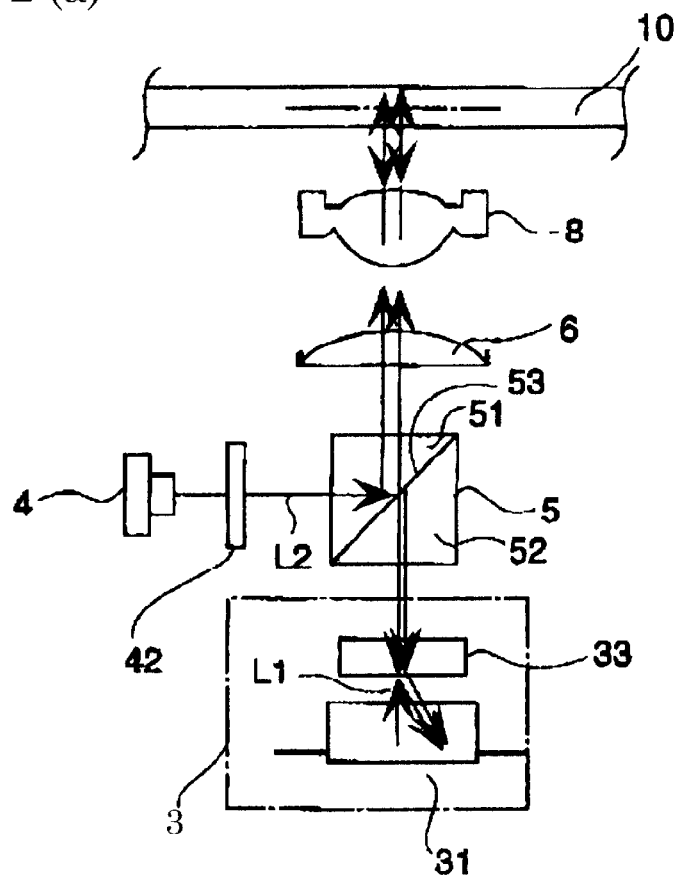
FIGS. 2(a) and 2(b) schematically show a structure of an optical system and a structure of a light source unit of the apparatus shown in FIG. 1, respectively.
Figure 2:
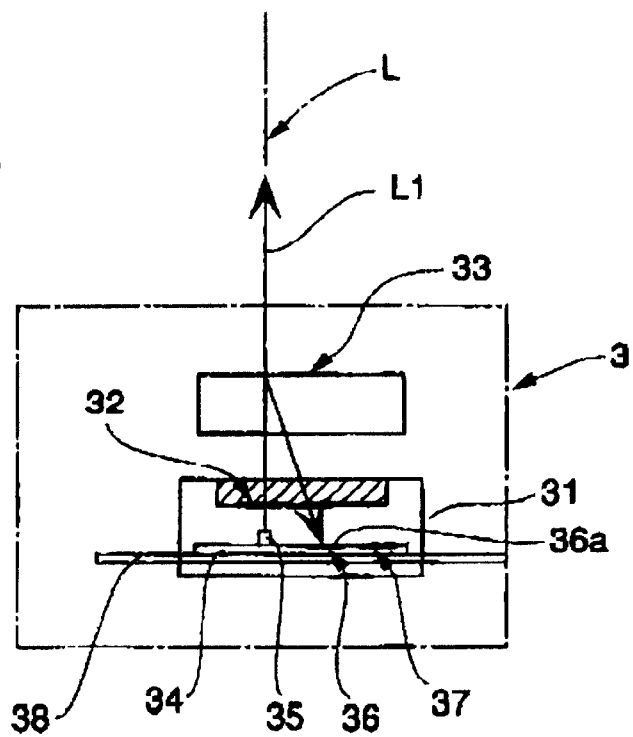

FIG. 2(a) shows only an optical system, and FIG. 2(b) shows the structure of the light source unit 3. Referring to the figures, the light source unit 3 is equipped with a light source section 31, a diffraction grating 32 for generating three beams, and a hologram 33 for focusing error signal generation and optical path polarization. The light source section 31 includes a semiconductor substrate 34, a laser diode chip 35 mounted on a surface of the semiconductor substrate 34, and a common light-receiving device 36 that is formed on the semiconductor substrate 34. The light source section 31 includes a signal processing circuit 37 that may also be formed on the semiconductor substrate 34. An external connector terminal 38 is mounted on the semiconductor substrate 34, such that an output from the signal processing circuit 37 is externally outputted through the external connector terminal 38. The common light-receiving device 36 has a light-receiving surface 36a. A structure of the light-receiving surface 36a of the common light-receiving device 36 is described below, with reference to FIG. 4.

First laser bean L1 is emitted from the laser diode chip 35 along a common optical path L. The first laser beam L1 is transmitted through the diffraction grating 32 to split it into three beams. Then the first laser beam L1 passes through the hologram 33, is emitted from the light source unit, and enters the prism 5.

Second laser beam L2 is emitted from the independent light source 4 in a direction perpendicular to the common optical axis L. The second laser beam L2 passes through a diffraction grating 42 for generating three beams to be split into three beams, and then enters the prism 5.

The first and second laser beams L1 and L2 that have passed the prism 5 are collimated by the collimate lens 6 to become parallel laser beams. Then, the laser beams are directed at right angle by the raising mirror (see FIG. 1), and transmitted through the objective lens 8, and converged on the optical disc 10.

Returning laser beams reflected on the optical disc 10 travel through the objective lens 8, the raising mirror 7 and the collimate lens 6, and return to the prism 5. A major part of the returning first laser beam passes through the half-reflective film 53 of the prism 5, and approximately a half of the returning second laser beam passes through the half-reflective film 53. As a result, both of the returning laser beams return to the light source unit 3, and enter the hologram 33 for focusing error signal generation and optical path polarization.

The hologram 33 provides different angles of diffraction (polarization) depending on wavelengths, and provides a greater diffraction angle for the returning first laser beam that is a long wavelength, compared to the returning second laser beam that is a short wavelength. Furthermore, the hologram 33 of the present embodiment generates focusing error signals. In order to generate focusing error signals, for example, the hologram 33 is formed with concentric circular grating patterns 33a and 33b that are divided in two regions by the optical axis L, as shown in FIG. 3(b). The laser beams that have passed through the two regions are focused at locations Fa and Fb, respectively, as shown in FIG. 3(a), that are located before and after the light-receiving surface 36a which lies on the same plane of the common light-receiving device 36. In other words, the laser beams are focused at a front focus point Fb and at a rear focus point with respect to the light-receiving surface 36a. The light-receiving surface 36a of the common light-receiving device 36 is provided with a certain structure that receives the returning laser beams (see FIG. 4).

In the optical pickup apparatus 1 of the present embodiment, the light source unit 3 has a circular outer peripheral section, for example a cylindrical outer surface. The apparatus frame 2 has a unit mounting section 21 that has a circular inner peripheral section. The circular outer peripheral section of the light source unit 3 is inserted in the circular inner peripheral section of the unit mounting section 21 (see FIG. 1), in a manner that the light source unit 3 can be rotated about the optical axis for adjustment. After the light source unit 3 is rotatably adjusted, the position of the light source unit 3 is fixed with respect to the apparatus frame 2 by any appropriate means such as an adhesive. Since the light source unit 3 is also equipped with the diffraction element 33 for generating three beams and the hologram 32 for error signal generation and optical path polarization, the angular positions of these elements are also adjusted at the same time as the light source unit is rotatably adjusted. On the other hand, the diffraction element 42 for generation of three beams on the side of the independent light source 4 is independently mounted on the apparatus frame 2, and therefore can be rotatably adjusted, independently of the diffraction element 33.

Figure 3:
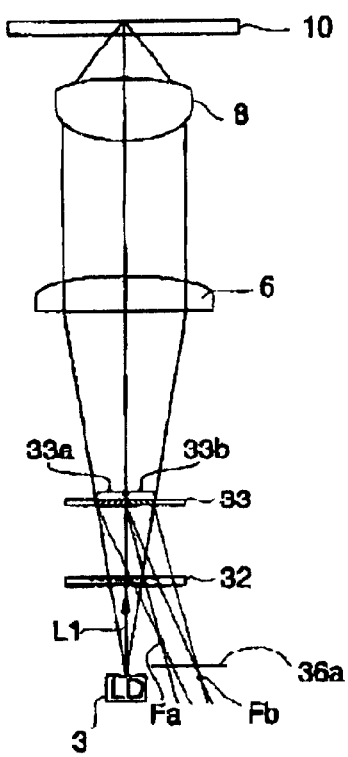
FIGS. 3(a) and 3(b) are explanatory views to explain a hologram for error signal generation and optical path polarization, and a diffraction pattern formed in the hologram.
Figure 3:
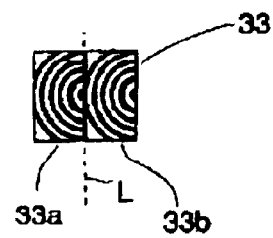

A structure of the light-receiving surface of the common light-receiving device of the present embodiment, and a signal processing method for focusing and generating tracking error signals are described below with reference to the FIGS. 3 and 4.

Figure 4:
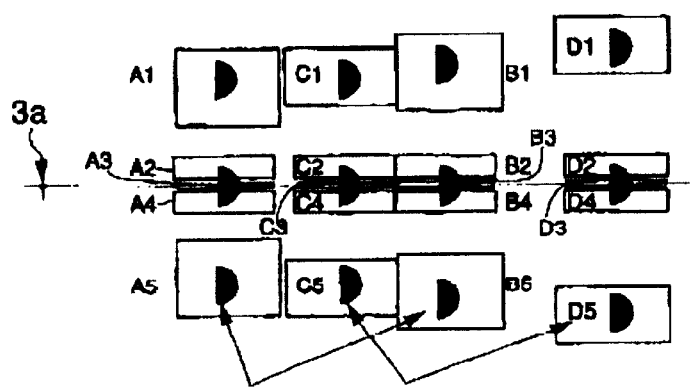
FIG. 4 shows a structure of a light-receiving surface of a common light-receiving element shown in FIG. 1.

First, as shown in FIG. 4, the light-receiving surface 36a of the common light-receiving device 36 of the present embodiment has light-receiving surfaces A1 through A5, light-receiving surfaces C1 through C5, light-receiving surfaces B1 through B5, and light-receiving surfaces D1 through D5, in this order from the side closer to a light emitting point 3a of a light source. The light-receiving surfaces are disposed on the same plane.

Among the light-receiving surfaces, the light-receiving surfaces C1 through C5 and the light-receiving surfaces D1 through D5 are adapted for receiving the returning first laser beam L1 that is a long wavelength. In other words, the main beam of the returning first laser beam L1 is separated by the hologram 33 for focusing error generation and optical path polarization into two laser beams having different diffraction angles, and irradiated on the central light-receiving surfaces C2, C3 and C4, and D2, D3 and D4, respectively. In a similar manner, each of the two sub-beams is also separated by the hologram 33 for focusing error generation and optical path polarization into two laser beams having different diffraction angles, and irradiated on the light-receiving surfaces C1 and C5, and D1 and D5 disposed on both sides of the central light-receiving surfaces, respectively.

The remaining light-receiving surfaces A1 through A5 and B1 through B5 are adapted for receiving the returning second laser beam L2 that is a short wavelength. In other words, the main beam of the returning second laser beam L2 is separated by the hologram 33 for focusing error generation and optical path polarization into two laser beams having different diffraction angles, and irradiated on the central light-receiving surfaces A2, A3 and A4, and B2, B3 and B4, respectively. In a similar manner, each of the two sub-beams is also separated by the hologram 33 for focusing error generation and optical path polarization into two laser beams having different diffraction angles, and irradiated on the light-receiving surfaces A1 and A5, and B1 and B5 disposed on both sides of the central light-receiving surfaces, respectively.

The principle of generating a focusing error signal is described below. The hologram 33 for focusing error generation and optical path polarization is provided with the patterns shown in FIG. 3(b), such that the laser beams that have passed the respective regions are focused at locations before and after the light-receiving surface. Accordingly, for the second laser beam, when the distance between the objective lens 8 and the optical disc 10 changes, semicircular beam spots irradiated on the central light-receiving surfaces A2 through A4 change inversely with semicircular beam spots that are irradiated on the other central light-receiving surfaces B2 through B4. In other words, when one of them becomes larger, the other becomes smaller. Therefore, when amounts of light received by the respective light-receiving surfaces A2 through A4 and B2 through B4 are a2 through a4 and b2 through b4, respectively, a focusing error signal FE can be obtained by the following formula:

$$FE=(a2+a4+b3)-(a3+b2+b4)$$

A focusing error signal FE for the first laser beam can also be obtained in the same manner.

Next, the principle for generating a tracking error signal TE is described below. In accordance with the present embodiment, the diffraction elements 32 and 42 for generating three beams are disposed. Therefore, a widely used three-beam method and a differential push-pull method (DPP) can be employed. When the three-beam method is used, and amounts of light received by the respective light-receiving surfaces A1 and A5 and B1 and B5 are a1 and a5 and b1 and b5, respectively, a tracking error signal TE is obtained by the following formula:

$$TE=(a1+b1)-(a5+b5)$$

When the differential push-pull method (DPP) is used, a tracking error signal TE can be obtained by the following formula:

$$TE=\{(a2+a3+a4)-(b2+b3+b4)\}-G\{(a1-b1)+(a5-b5)\}$$

It is noted that a reproduced signal RF can be obtained by the following formula:

$$RF=a2+a3+a4+b2+b3+b4.$$

Also, for the returning first laser beam, the signals described above can be obtained in a similar manner based on amounts of light received by the light-receiving surfaces C1 through C5 and D1 through D5.

In the embodiment described above, the diffraction elements 32 and 42 for generating three beams are used. However, when the tracking error signal is generated by a method other than the three-beam method, the diffraction elements can be omitted. For example, a phase differential method (DPD) may be used. In this case, a tracking error signal TE is obtained by the following formula:

$$TE=\text{phase }(a2+b4)-\text{phase }(a4+b2)$$

It is noted that, in the embodiment described above, the first laser beam emitted from the light source unit 3 is of a long wavelength. However, the first laser beam may be of a short wavelength, and the second laser beam emitted from the independent light source 4 may be of a long wavelength.

Furthermore, the above-described embodiments are relevant to two-light source type optical pickup apparatuses. However, the present invention can be similarly applied to multiple-light sources optical pickup apparatuses having three or more light sources. In such a case, one or a plurality of independent light sources may be disposed adjacent to the independent light source 4 in a manner that optical axes thereof are in parallel with one another. An optical path composition element for guiding each of the beams from the respective independent light sources to a common optical path is disposed on the common optical path. When the three-beam method is used to generate tracking error signals, diffraction elements and the like may be disposed on the light emitting side of each of the independent light sources. In this case, a common light-receiving device within a light source unit can be used as a light-receiving element.

Figure 5:
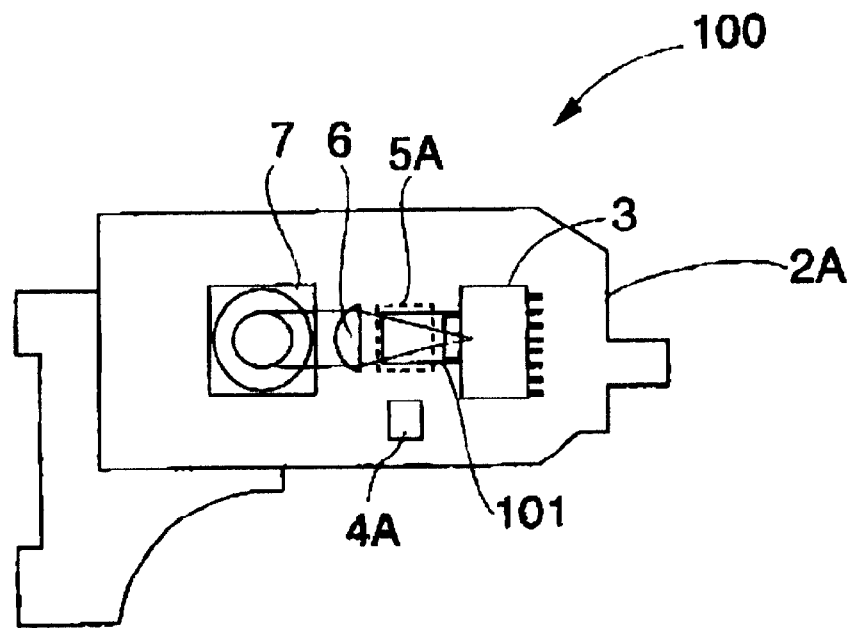
FIGS. 5(a) and 5(b) show a plan view and a cross-sectional view of an optical pickup apparatus in accordance with another embodiment of the present invention.
Figure 5:
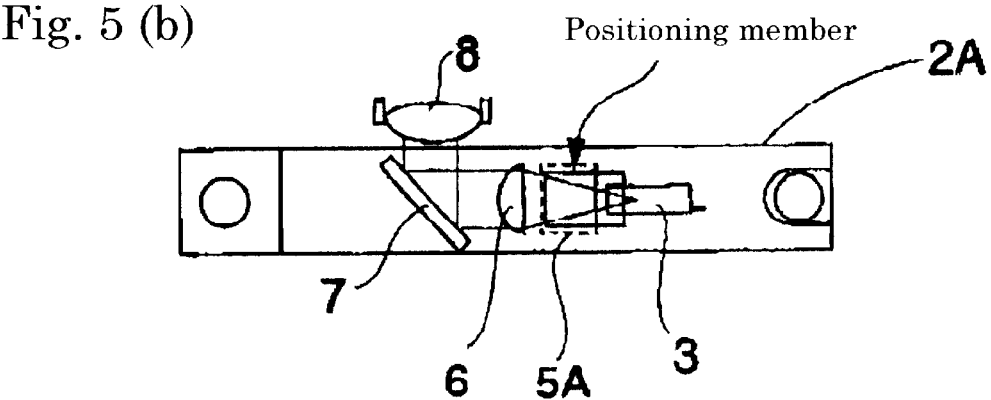

FIG. 5 shows an optical pickup apparatus 100 in accordance with another embodiment of the present invention. The optical pickup apparatus 100 does not use the independent light source 4. More particularly, the optical pickup apparatus 100 has an optical system in which the independent light source 4 and the prism 5 as an optical path composition element are removed from the apparatus 1 described above.

The optical pickup apparatus 100 has an apparatus frame 2A that can be used for a single light source type optical pickup apparatus and a two-light source type optical pickup apparatus. The apparatus frame 2A is formed with a mounting section 4A for an independent light source 4 and a mounting section 5A for a prism 5. The apparatus frame 2A is also provided with a positioning member 101 for adjusting the position of a light source unit 3 in the direction of an optical axis. The light source unit 3 is mounted on the apparatus frame 2A through the positioning member 101.

When an individual light source 4 and a prism 5 are mounted on the apparatus frame 2A, the optical pickup apparatus 100 serves as a two-light source type optical pickup apparatus that is similar to the one shown in FIG. 1. In contrast, when the individual light source 4 is not required, the individual light source 4 and the prism 5 can be removed from the apparatus frame 2A. As a result, the optical pickup apparatus 100 serves as a single light source type optical pickup apparatus, as shown in FIG. 5.

In the single light source type optical system, the prism 5 is removed, and the optical path distance accordingly changes. When the optical path distance changes, there is a possibility that a required optical signal may not be obtained at the light-receiving element. However, in accordance with the present embodiment, the light source unit 3 is positioned by the positioning member 101 to adjust the mounting position of the light source unit 3 in the direction of the optical axis with respect to the apparatus frame 2A. Therefore, for example, the positioning member 101 may be adjusted to locate the light source unit 3 closer to the collimate lens to offset the change of the optical path distance that occurs with the removal of the prism. Alternatively, an appropriate position of the light source unit 3 is determined when the prism 5 is removed, and the positioning member 101 having an engaging section is fixed at the position. The light source unit 3 is abutted to the engaging section to determine the mounting position of the light source unit 3.

In the embodiments described above, laser beam sources are used. However, light sources other than the laser light sources, such as, for example, LED light sources and the like can be used.

As described above, an optical pickup apparatus in accordance with the embodiment of the present invention has a light source unit including a first light source and a common light-receiving device built therein, and a second light source independent of the first light source that is provided in the light source unit. Returning lights of the lights emitted from both of the light sources are guided into the common light-receiving device. In this manner, a single light-receiving device is used. As a result, the overall cost for the apparatus is reduced, compared with an optical pickup apparatus that has multiple light source units in which each of the light source units is provided with a light receiving unit.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical pickup apparatus including a first light source that emits a first light, a second light source that emits a second light having a wavelength different from a wavelength of the first light, an objective lens that converges the first light and the second light on a recording medium, first and second light-receiving sections that receive the first and second light reflected from the recording medium and passed through the objective lens, the optical pickup apparatus comprising:
   a light source unit that includes the first light source and a common light-receiving device that includes the first and second light-receiving sections;
   a second light source that is not included in the light source unit;
   an optical path composition element that guides the first light and the second light into an optical path that passes the objective lens; and
   an optical path polarization element that guides the reflected lights of the first and the second lights to the common light-receiving device in the light source unit, wherein the optical path polarization element is a diffraction type optical element that is mounted on the light source unit to form an integral part of the light source unit, and is rotatably adjustable about an optical axis of the first light emitted;
      wherein the first and second light-receiving sections are formed on a semiconductor substrate and include a first group and a second group of light-receiving elements that respectively receive the reflected lights of the first light and the second light.

2. An optical pickup apparatus according to claim 1, wherein the light source unit defines a circular outer periphery section that is fitted inside a circular inner periphery section defined in a unit mounting section formed in an apparatus frame in a manner rotatably adjustable about the optical axis.

3. An optical pickup apparatus according to claim 1, further comprising a positioning member that supports the light source unit in a manner that an optical distance between the light source unit and the objective lens is adjustable.

4. An optical pickup including a first light source that emits a first light, a second light source that emits a second light having a wavelength different from a wavelength of the first light, an objective lens that converges the first light and the second light on a recording medium, first and second light-receiving sections that receive the first and second light reflected from the recording medium and passed through the objective lens, the optical pickup apparatus comprising:
   a light source unit that includes the first light source and a common light-receiving device that includes the first and second light-receiving sections;
   a second light source that is not included in the light source unit;
   an optical path composition element that guides the first light and the second light into an optical path that passes the objective lens; and
   an optical path polarization element, wherein the optical path polarization element is formed with a grating pattern for generating a focusing error signal that guides the reflected lights of the first and the second lights to the common light-receiving device in the light source unit;
      wherein the first and second light-receiving sections are formed on a semiconductor substrate and include a first group and a second group of light-receiving elements that respectively receive the reflected lights of the first light and the second light.

5. An optical pickup apparatus according to claim 4, wherein the grating pattern for generating a focusing error signal includes two regions that are divided by an optical axis, is positioned in a manner that focus points of lights passing the respective regions are positioned before and after a light-receiving surface, respectively.

6. An optical pickup apparatus according to claim 5, wherein each of the first and second groups of light-receiving elements on the semiconductor substrate includes two columns of light-receiving elements, wherein one of the two columns of one of the groups is disposed between the two columns of the other of the groups.

7. An optical pickup apparatus according to claim 1, further comprising a first diffraction element that splits the first light emitted into three beams, and a second diffraction element that splits the second light emitted into three beams, wherein positions of the first diffraction element and the second diffraction element are adjustable independently from one another.

8. An optical pickup apparatus comprising:
   an apparatus frame;
   a light source unit mounted on the apparatus frame, the light source unit having a first light source that emits first light of a first wavelength and a common light-receiving device including first and second light-receiving sections;
   a second light source that is not included in the light source unit;
   a diffraction type optical element, mounted on the light source unit to form an integral part of the light source unit, that guides at least reflected light of the first light to the common light-receiving device in the light source unit, wherein the diffraction type optical element is rotatable for adjustment about an optical axis of the first light emitted from the first light source; and an optical system that defines an optical axis, the optical system being mounted on the apparatus frame for guiding at least the first light;

wherein the common light-receiving device receives reflected light from the first and second light sources, and wherein the first and second light-receiving sections are formed on a semiconductor substrate and include first group and second group of light-receiving elements that receive reflected lights of the first light and the second light, respectively.

9. An optical pickup apparatus according to claim 8, wherein the second light source is mounted on the apparatus frame for emitting a second light of a second wavelength different from the first wavelength, the second light source being disposed independent of the light source unit, wherein the optical system includes an objective lens and an optical path composition element that guides the first light and the second light into the optical path that passes the objective lens, and the optical path polarization element guides reflected from the first and the second light sources to the common light-receiving device in the light source unit.

10. An optical pickup apparatus according to claim 8, wherein the light source unit defines a circular outer periphery section, and the apparatus frame has a circular inner periphery section, wherein the circular outer periphery section of the light source unit is fitted in the circular inner periphery section of the apparatus frame in a manner rotatably adjustable about the optical axis.

11. An optical pickup apparatus according to claim 10, wherein the apparatus frame includes a positioning member that movably supports the light source unit to thereby change the position of the light source unit with respect to the optical system.

12. An optical pickup apparatus according to claim 9, wherein the optical path polarization element is formed with a grating pattern for generating a focusing error signal.

13. An optical pickup apparatus according to claim 12, wherein the grating pattern for generating a focusing error signal includes two regions that are divided by the optical axis, and is positioned in a manner that focus points of lights passing through the respective regions are positioned before and after a light-receiving surface of the common light. receiving device, respectively.

14. An optical pickup apparatus according to claim 13, wherein each of the first and second groups of light-receiving element includes two columns of light-receiving elements, wherein one of the two columns of one of the groups is disposed between the two columns of the other of the groups.

15. An optical pickup apparatus according to claim 9, further comprising a first diffraction element that splits the first light emitted from the first light source into three beams, and a second diffraction element that splits the second light emitted from the second light source into three beams, wherein positions of the first diffraction element and the second diffraction element are adjustable independently from one another.

16. A method for manufacturing an optical pickup apparatus for recording and/or reading data on an optical storage medium, the method comprising the steps of:

providing an apparatus frame;

forming a light source unit to be mounted on the apparatus frame;

mounting on the light source unit a first light source that emits first light of a first wavelength and a common light-receiving device including first and second light-receiving sections that receives at least reflected light from the first light source;

mounting the light source unit on the apparatus frame;

forming a second light source that emits second light of a second wavelength different from the first wavelength, wherein the second light source is not a part of the light source unit;

mounting the second light source on the apparatus frame so that the common light-receiving device receives reflected light from the second light source;

mounting an optical path polarization element on the light source unit to form an integral part of the light source unit, in a manner rotatable for adjustment about an optical axis of the first light emitted from the first light source, wherein the optical path polarization element guides at least reflected light from the first light source to the common light-receiving device in the light source unit; and mounting on the apparatus frame an optical system that defines an optical axis for guiding at least the first light.

17. A method for manufacturing an optical pickup apparatus according to claim 16, further comprising the step of providing an optical path composition element that guides the first light and the second light into the optical path, wherein the optical path polarization element guides reflected light from the first and the second light sources to the common light-receiving device in the light source unit.

18. A method for manufacturing an optical pickup apparatus according to claim 16, further comprising the steps of providing the optical path polarization element with a grating patter for generating a focusing error signal, and dividing the grating pattern into two regions by the optical axis to position focus points of lights passing the respective regions before and after a light-receiving surface of the common light-receiving device, respectively.

19. A method for manufacturing an optical pickup apparatus according to claim 16, further comprising the steps of providing the common light receiving device with first and second light-receiving sections formed by a first group and a second group of light-receiving elements that receive reflected light from the first light source and the second light source, respectively, and forming each of the first and second groups of light-receiving elements with two columns of light-receiving elements, and disposing one of the two columns of one of the groups between the two columns of the other of the groups.

20. A method for manufacturing an optical pickup apparatus according to claim 17, further comprising the steps of disposing a first diffraction element that splits the first light emitted from the first light source into three beams, and disposing a second diffraction element that splits the second light emitted from the second light source into three beams, wherein positions of the first diffraction element and the second diffraction element are adjusted independently from one another.

21. A method for manufacturing an optical pickup device according to claim 16, further comprising the steps of forming a circular outer periphery section in the light source unit, forming a circular inner periphery section in the apparatus frame, and fitting the circular outer periphery section of the light source unit in the circular inner periphery section of the apparatus frame in a manner rotatably adjustable about the optical axis.

22. A method for manufacturing an optical pickup apparatus according to claim 21, further comprising the steps of providing the apparatus frame with a positioning member that movably supports the light source unit to thereby change the position of the light source unit with respect to the apparatus frame.

* * * * *